United States Patent [19]

Gerding et al.

[11] Patent Number: 4,549,366
[45] Date of Patent: Oct. 29, 1985

[54] ADJUSTABLE NEEDLEWORK STAND

[76] Inventors: Beverly J. Gerding; Richard W. Haller, both of 14339 Carolcrest, Houston, Tex. 77079

[21] Appl. No.: 612,661

[22] Filed: May 21, 1984

[51] Int. Cl.[4] .............................................. D06C 3/08
[52] U.S. Cl. .................... 38/102.2; 248/185; 269/71; 403/262
[58] Field of Search ............... 403/164, 165, 408, 320, 403/262; 248/185, 184, 183, 371, 122, 158; 223/120; 38/102.2; 269/71, 82; 16/273

[56] References Cited

U.S. PATENT DOCUMENTS

| 437,240 | 9/1890 | Przewdzink | 38/102.2 |
| 1,349,633 | 8/1920 | Staley | 248/184 X |
| 2,621,443 | 12/1952 | Black | 403/165 X |
| 3,774,325 | 11/1973 | Johnson et al. | 248/122 X |
| 3,818,620 | 6/1974 | Field et al. | 38/102.2 |
| 3,855,718 | 12/1974 | Parsons et al. | 38/102.2 |
| 3,991,436 | 11/1976 | Nagase | 16/273 |
| 4,213,560 | 7/1980 | Hall | 248/122 X |
| 4,235,559 | 11/1980 | Rooklyn | 403/262 |
| 4,435,100 | 3/1984 | Cox | 403/408 X |

FOREIGN PATENT DOCUMENTS

| 1200348 | 12/1959 | France | 248/121 |
| 2382140 | 10/1978 | France | 248/183 |

Primary Examiner—Werner H. Schroeder
Assistant Examiner—Andrew M. Falik
Attorney, Agent, or Firm—Neal J. Mosely

[57] ABSTRACT

A stand for rotatably and pivotally supporting a needlework hoop or the like comprises a tubular frame having a base and a pedestal member extending vertically therefrom. An extension member rotatably attached to the pedestal member has a pair of pivotally connected support arms extending outwardly therefrom to receive and support a needlework holder, e.g. an embroidery hoop. The support arms are attached to the extension member such that the hoop may be retained in a pivotally adjusted position. The pedestal member may be provided with a horizontally extended portion permitting the stand to be used in doing needlework in a chair where a vertical stand may not fit, or in bed.

3 Claims, 5 Drawing Figures

ADJUSTABLE NEEDLEWORK STAND

BACKGROUND OF THE INVENTION

1. Field of the Invention

This invention relates to adjustable stands, and more particularly to a stand for pivotally and rotatably supporting an embroidery hoop or the like.

2. Brief Description of the Prior Art

The art of needlework requires long hours of sitting and holding a hoop in one hand while working with the other. It is therefore desirable to provide a means of supporting the hoop at various angles and to leave the hands free to accomplish the stitching while the artisan is in a comfortable position.

Stands used for supporting needlework hoops are known in the art. Some conventional stands only allow the frame to move backward and forward. There are several patents which disclose various stands for adjustably supporting needlework apparatus.

Wilson, U.S. Pat. No. 3,309,803 discloses lap and floor type embroidery holders. In one embodiment, a hoop is tiltably attached by wing nuts to a head member at the top of a post extending vertically from a lap-held base. In another lap-held embodiment, a pair of wing nut and clevis connections are provided between the base and the same head and hoop construction. In another floor supported embodiment, the same head and hoop configuration is mounted on a clevis disposed at the top of a telescoping support member.

Parsons et al, U.S. Pat. No. 3,855,718 discloses an adjustable mounting for work objects and the like. The mounting comprises a ball and socket assembly disposed at the top of a vertical pole mounted on a base. The ball and socket assembly has braces which extend outwardly therefrom to carry the work supporting member or hoop.

The prior art in general, and none of these patents in particular, disclose an embroidery stand having a frame to receive and support an embroidery hoop which permits a full 360° rotation of the hoop and a full 90° tilt of the hoop to either side.

SUMMARY OF THE INVENTION

One object of this present invention to provide a stand for supporting an embroidery hoop or the like in a comfortable position for use.

Another object of this invention is to provide a stand for supporting an embroidery hoop wherein the hoop may be rotated in a complete circle about its vertical axis.

Another object of this invention is to provide a stand for supporting an embroidery hoop wherein the hoop may be pivoted in a full 180° arc about a horizontal axis and remain in any adjusted position.

Another object of this invention is to provide a stand for supporting an embroidery hoop in a manner such that the hands of the user are unencumbered.

Another object of this invention is to provide a stand for supporting an embroidery hoop whereby the user may may be afforded the comfort of using the stand in a standing, sitting, or reclining position.

Another object of this invention is to provide a stand for supporting an embroidery hoop which is strong, rugged and durable and inexpensive to manufacture.

Other objects of the invention will become apparent from time to time throughout the specification and claims as hereinafter related.

The above noted objects and other objects of the invention are accomplished by a stand for rotatably and pivotally supporting a needlework hoop or the like having a tubular frame with a base and a pedestal member extending vertically therefrom. An extension member rotatably attached to the pedestal member has a pair of pivotally connected support arms extending outwardly therefrom to receive and support a needlework holder, e.g. an embroidery hoop. The support arms are attached to the extension member such that the hoop may be rotated a full 360° about its center and tilted a full 90° to either side and be retained in a pivotally adjusted position. The pedestal member may be provided with a horizontally extended portion permitting the stand to be used in doing needlework in a chair where a vertical stand may not fit, or in bed.

DESCRIPTION OF THE PREFERRED EMBODIMENT

Figure 1:
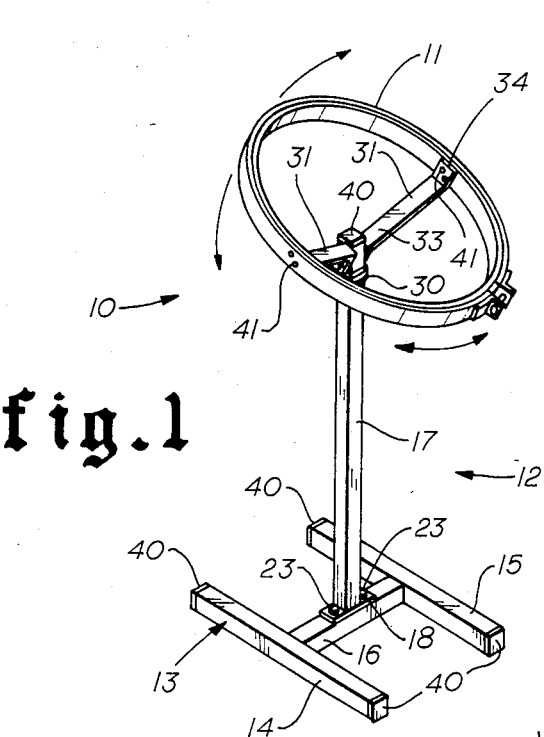
FIG. 1 is an isometric view of one embodiment of the embroidery stand in accordance with the present invention.
Figure 2:
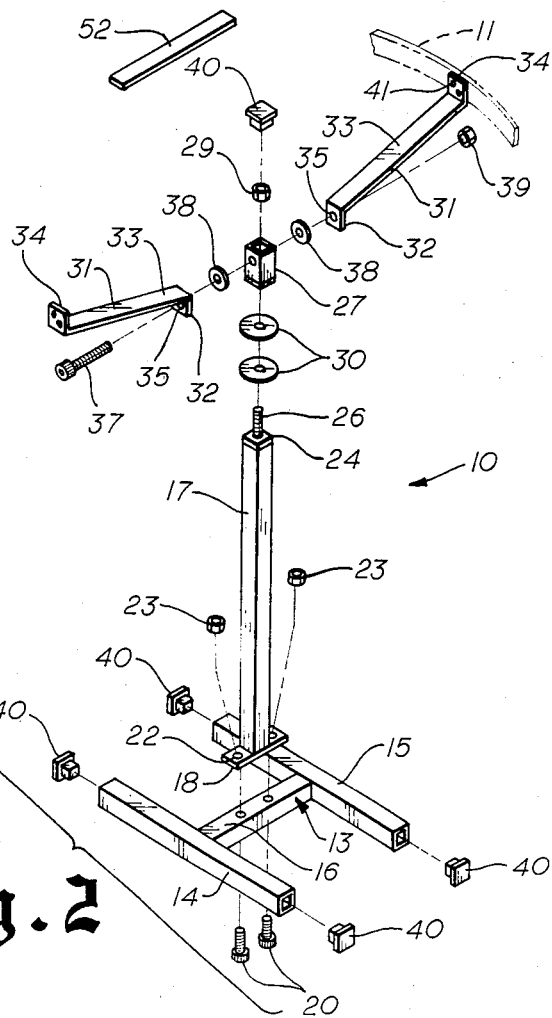
FIG. 2 is an exploded isometric view of the components of the stand embodiment of FIG. 1.
Figure 3:
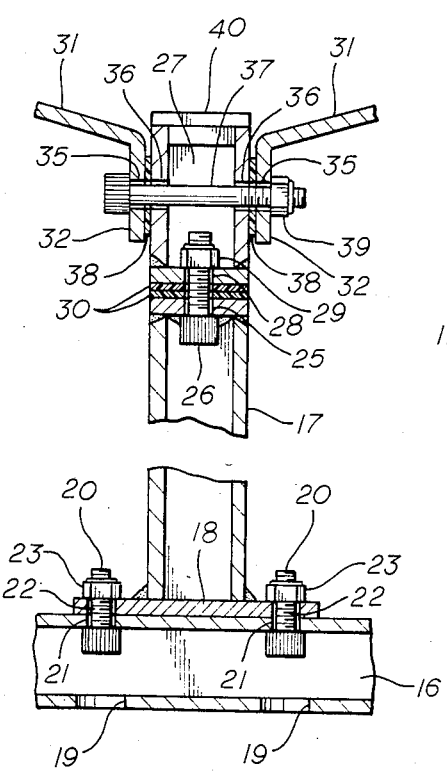
FIG. 3 is a segmented elevational view in vertical cross section showing how the components are attached.

Referring to the drawings by numerals of reference, and particularly to FIGS. 1, 2, and 3, there is shown a preferred embroidery stand 10 for pivotally and rotatably supporting an embroidery hoop 11.

The frame 12 of the stand 10 comprises a base 13 having two opposed parallel leg members 14 and 15 with a centrally disposed crossmember 16 secured transversely therebetween by welding or the like. A pedestal member 17 having a flat rectangular base plate 18 disposed at the bottom end is releasably attached at the center of the crossmember 16 and extends vertically upward therefrom. The legs 14 and 15, crossmember 16, and pedestal 17 are composed of square tubing.

Openings 19 provided in the bottom surface of crossmember 16 are of sufficient size to allow insertion of socket head cap screws 20 therethrough, and axially aligned openings 21 in the top surface allow only the threaded portion of the cap screws 20 to protrude therefrom to be received by the holes 22 in the base plate 18. A pair of lock nuts 23 threaded onto the cap screws 20 secures the pedestal 17 to the crossmember 16. All nuts used in the present invention are of the ESNA lock nut type having an internal plastic insert in the top portion preventing them from working loose.

The extended top end of the pedestal 17 has an end plate 24 welded thereto. The plate 24 is provided with a central opening 25 (FIG. 3) through which passes the threaded portion of a cap screw 26. The head portion of the cap screw 26 is welded (FIG. 3) to the underside of the plate 24.

An embroidery hoop supporting structure comprises two support arms 31 each having a short downwardly depending portion 32 at one end and a longitudinal middle portion 33 which extends angularly upward therefrom to terminate in an upwardly extending portion 34. Support arms are secured at the top to embroidery hoop 11 and at the bottom end are bolted to opposing sides of a rotary extension member 27 on pedestal 17. The downwardly depending portions 32 have openings 35 aligned with openings 36 in opposite sides of extension member 27 near the top open end to receive the shank portion of a cap screw 37. Support arms 31 are preferably secured together by a flat brace 52 which is welded or brazed in place.

Extension member 27 is formed of square tubing having one enclosed end having a central opening 28 receiving the threaded portion of the cap screw 26 and is bolted on plate 24 by lock nut 29. Two thin nylon washers 30 between plate 24 and extension member 27 provide reduced friction and allow complete rotary motion of extension member 27 relative to pedestal 17.

Nylon washers 38 between extension member 27 and the depending end portions 32 of support arms 31 provide reduced frictional movement therebetween. A lock nut 39 is threaded onto the cap screw 37 with sufficient torque such that the support arms 31 may be pivotally moved relative to the extension member 27, and remain in the last position without the use of retaining means such as thumbscrews and the like.

Suitable rubber or plastic end caps 40 are inserted into the open ends of the tubular components to provide an attractive appearance and eliminate sharp corners which might injure the user or damage the surroundings.

Hoop 11 is attached to each of the upwardly extending ends 34 of the support arms 31 by suitable means such as rivets 41 or bolts or the like. Hoop 11 may be of any conventional design or shape commonly used in needlework such as embroidery, crewel, quilting, needlepoint, or candlewicking. The present invention shows the use of a conventional wooden embroidery hoop comprising an inner ring or oval attached to the support arms 31 and a removable outer hoop or oval slidably and adjustably received thereon.

Figure 4:
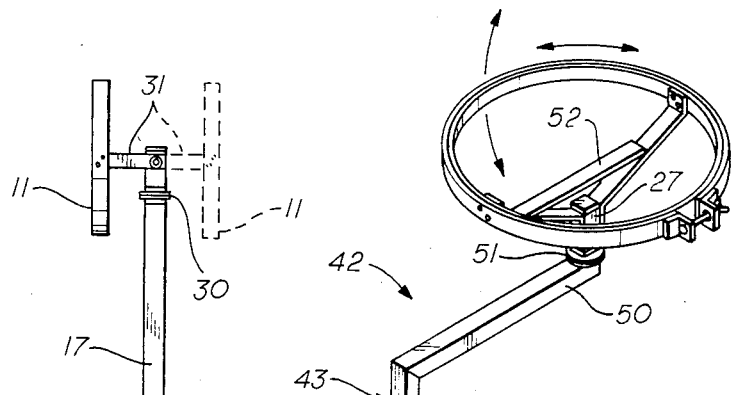
FIG. 4 is a partial side elevational view showing the pivotal movement of the stand.

As shown in FIGS. 1 and 4, hoop 11 may rotate about the vertical axis in a full 360° circle, and pivot about the horizontal axis in a full 180°. Hoops can be removed easily and quickly by removing one cap screw assembly. Different hoop sizes and shapes may be used by provision of support arms having various lengths.

AN ALTERNATE EMBODIMENT

Figure 5:
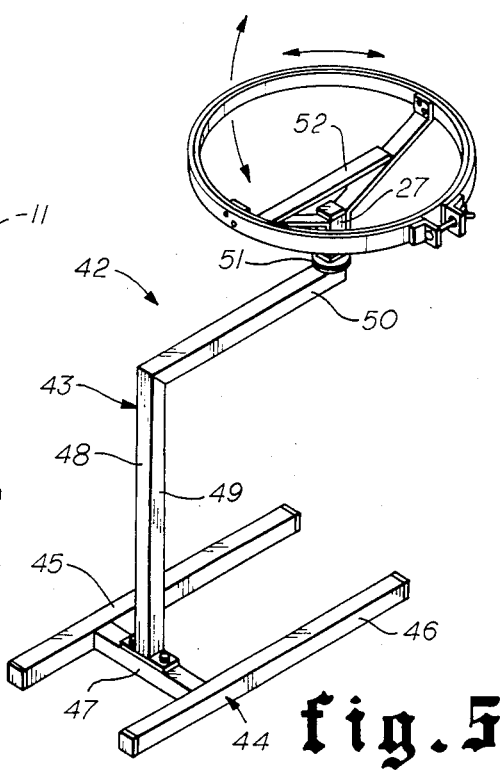
FIG. 5 is an alternate embodiment of the embroidery stand in accordance with the present invention.

FIG. 5 shows a modified embodiment of the stand 42 wherein the frame 41 comprises a base 44 having two opposed parallel leg members 45 and 46 with a crossmember 47 secured transversely therebetween and near one end thereof by suitable means such as welding. A pedestal member 48 having a vertically extending portion 44 and a horizontally extending portion 50 is releasably attached to the crossmember 47 in the same manner as previously described.

An opening is provided in the bottom surface of the horizontally extending portion 50 near its outer end of sufficient size to allow insertion of a cap screw therethrough, and an axially aligned opening in the top surface to allow only the threaded portion of the cap screw to protrude therefrom, in the same manner as previously described for attaching the pedestal to the crossmember. It should be understood that the head of the cap screw may be welded into position as previously described.

Extension member 27 receives the threaded portion of the cap screw and is bolted onto the top surface of the horizontally extending portion of the pedestal 50 by means of a lock nut (not shown). Two thin nylon washers 51 are between the top surface of the extended portion 50 and the extension member 27 provide reduced friction and allow complete rotary motion of the extension member 27 relative to the pedestal 48.

The embodiment of FIG. 5 is particularly useful for doing embroidery in a large comfortable chair where a vertical stand may not fit. The horizontally extended portion 50 of the stand 42 is of suitable height and length to extend over a bed to facilitate embroidering comfortably in a reclining position.

While this invention has been described fully and completely with special emphasis upon a preferred embodiment, it should be understood that within the scope of the appended claims the invention may be practiced otherwise than as specifically described herein.

We claim:

1. A stand supporting an embroidery hoop for adjustable pivotal and rotary movement comprising:
    a base formed of square tubing comprising a pair of horizontal parallel leg members and a crossmember secured transversely substantially centrally therebetween,
    a pedestal member formed of square tubing extending vertically from said base substantially centrally of said cross member,
    a plurality of bolts removably securing said pedestal member on said cross member,
    a support member comprising a short section of square tubing rotatably attached to said pedestal member,
    a pair of support arms, each having one end pivotally attached to opposite sides of said support member and another end extending outwardly therefrom,
    an embroidery hoop secured to and supported between the ends of said support arms,
    a bolt securing said support member on said pedestal member and a nylon anti-friction washer interposed between said support member and said pedestal member attaching said support member to said pedestal member for 360° rotary movement thereon, and
    a bolt pivotally attaching said support arms to said support member and a nylon anti-friction washer interposed between each support arm and said support member and operable to retain said hoop in a selected pivotally adjusted position through 180° of movement,
    each of said bolts comprising a cap screw and a lock nut with an elastomeric insert resisting unthreading.

2. A stand according to claim 1 further including end caps closing the open ends of said tubing.

3. A stand according to claim 1 in which
    said pedestal member comprises a first vertical portion and a second vertical portion spaced above and offset laterally therefrom, and
    a horizontal portion interconnecting the top of said first vertical portion and the bottom of said second vertical portion,
    said support member being pivotally supported on said second vertical portion.

* * * * *